United States Patent
Hong et al.

(10) Patent No.: US 8,817,759 B2
(45) Date of Patent: Aug. 26, 2014

(54) METHOD AND APPARATUS FOR SPATIAL REUSE BY ASSISTANCE OF DISTRIBUTED DEVICES OVER WIRELESS SYSTEM USING DIRECTIONAL ANTENNAS

(75) Inventors: Seung Eun Hong, Daejeon (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 563 days.

(21) Appl. No.: 12/852,792

(22) Filed: Aug. 9, 2010

(65) Prior Publication Data

US 2011/0116393 A1   May 19, 2011

(30) Foreign Application Priority Data

Aug. 10, 2009  (KR) .................. 10-2009-0073110
Jun. 7, 2010   (KR) .................. 10-2010-0053267
Jul. 28, 2010  (KR) .................. 10-2010-0072660

(51) Int. Cl.
*H04W 72/04* (2009.01)
*H04W 72/08* (2009.01)
*H04W 84/20* (2009.01)
*H04W 24/10* (2009.01)

(52) U.S. Cl.
CPC ............ *H04W 72/082* (2013.01); *H04W 72/04* (2013.01); *H04W 84/20* (2013.01); *H04W 24/10* (2013.01)
USPC ........................................................ 370/338

(58) Field of Classification Search
None
See application file for complete search history.

(56) References Cited

U.S. PATENT DOCUMENTS

| | | | |
|---|---|---|---|
| 7,602,760 B2 | 10/2009 | Zeira | |
| 7,894,371 B2 * | 2/2011 | Bonta et al. | 370/254 |
| 8,149,795 B2 * | 4/2012 | Kwon et al. | 370/336 |
| 8,149,806 B2 * | 4/2012 | Kesselman et al. | 370/338 |
| 2005/0058151 A1 * | 3/2005 | Yeh | 370/445 |
| 2005/0089001 A1 * | 4/2005 | Nishikawa | 370/338 |
| 2008/0013519 A1 * | 1/2008 | Kwon et al. | 370/345 |
| 2008/0175199 A1 * | 7/2008 | Shao et al. | 370/329 |
| 2009/0034432 A1 * | 2/2009 | Bonta et al. | 370/255 |
| 2009/0225730 A1 * | 9/2009 | Kesselman et al. | 370/338 |
| 2009/0232116 A1 * | 9/2009 | Li et al. | 370/338 |
| 2010/0014463 A1 | 1/2010 | Nagai et al. | |
| 2010/0111006 A1 * | 5/2010 | Zhai et al. | 370/329 |
| 2010/0142460 A1 * | 6/2010 | Zhai et al. | 370/329 |

FOREIGN PATENT DOCUMENTS

KR   2008-0061328 A   7/2008

* cited by examiner

*Primary Examiner* — Robert C Scheibel
(74) *Attorney, Agent, or Firm* — Rabin & Berdo, P.C.

(57) ABSTRACT

Disclosed are a method for spatial reuse by support of distributed devices in a wireless communication system using a directional antenna, and an apparatus for the same. In the wireless communication system using the directional antenna, the method arranges an antenna with respect to a target device for communication before the distributed devices request a resource for communication, informs the target device or a central control unit in advance of a measurement result of a signal in MASs through the antenna, and requests a resource and receives a resource allocation based on the measurement result.

7 Claims, 18 Drawing Sheets

FIG. 9

| Octet:1 | 1 | 1 | 1 |
|---|---|---|---|
| Element ID | Length | Beam Index | Average RSSI |

900

910　920　930　940

METHOD AND APPARATUS FOR SPATIAL REUSE BY ASSISTANCE OF DISTRIBUTED DEVICES OVER WIRELESS SYSTEM USING DIRECTIONAL ANTENNAS

BACKGROUND

1. Field of the Invention

The present invention relates to a method and apparatus to improve a capacity of a system through spatial reuse in a wireless system using a directional antenna.

2. Description of the Related Art

In a wireless communication system using a directional antenna, when directional antennas of terminals forming a communication link are formed in a direction so that beams from the directional antennas do not influence terminals forming another communication link, there is no interference in the respective communication links by each other even though the same frequency and time resources are used. Thus, the terminals using the directional antennas ease spatial reuse as compared with devices using omni-directional antennas. Further, since a signal is transmitted and received mostly in a predetermined direction, long-distance transmission and reception are enabled using limited power.

However, despite ease of spatial reuse by using directional antennas, a concrete method of spatial reuse has not been suggested.

SUMMARY

An aspect of the present invention provides an apparatus and a method to improve a capacity of a system through spatial reuse in a wireless communication system using a directional antenna.

Another aspect of the present invention also provides an apparatus and a method to improve a capacity of a system through spatial reuse in a wireless communication system using a directional antenna based on a centralized MAC protocol.

Still another aspect of the present invention also provides an apparatus and a method to improve a capacity of a system through spatial reuse in a wireless communication system using a directional antenna based on a distributed MAC protocol.

According to an aspect of the present invention, there is provided a spatial reuse method of a source device of a wireless communication system using a distributed MAC protocol, the method including: obtaining information about a pre-allocated resource of each communication channel through a beacon message received from adjacent devices; measuring a strength and an interference of a received signal corresponding to the resources of the communication channel; exchanging a scanning result information element (IE) of each communication channel including measurement results of the strength and the interference of the received signal corresponding to the resources of the communication channel, and exchanging the information about the pre-allocated resource of the communication channel with a target device; selecting a communication channel using the scanning result IE of the communication channel of the source device, the scanning result IE of the communication channel of the target device, and the information about the pre-allocated resource of the communication channel; and requesting a resource from the target device based on a scanning result IE of the selected channel and information about a pre-allocated resource of the selected channel and receiving a resource allocation from the target device.

According to an aspect of the present invention, there is provided a spatial reuse method of a target device of a wireless communication system using a distributed MAC protocol, the method including: obtaining information about a pre-allocated resource of each communication channel through a beacon message received from adjacent devices; measuring a strength and an interference of a received signal corresponding to the resources of the communication channel; exchanging scanning result IE of the communication channel including measurement results of the communication channel and the information about the pre-allocated resource of the communication channel with a source device; and receiving a request for a resource from the source device and allocating a resource to the source device.

According to an aspect of the present invention, there is provided a spatial reuse method of a source device of a wireless communication system using a centralized MAC protocol, the method including: obtaining information about a pre-allocated resource through resource allocation information received from a central control unit; measuring a strength and an interference of a received signal corresponding to the resources; transmitting a scanning result IE including measurement results of the strength and the interference of the received signal corresponding to the resources to the central control unit; requesting a resource from the central control unit; and receiving a resource allocation from the central control unit in an order of a resource having a lower interference through the scanning result IE of the source device and scanning result IE of a target device.

According to an aspect of the present invention, there is provided a spatial reuse method of a central control unit of a wireless communication system using a centralized MAC protocol, the method including: broadcasting a beacon message including resource allocation information; receiving a scanning result IE including measurement results of a strength and an interference of a received signal corresponding to resources from each of a source device and a target device; receiving a request for a resource from the source device; and replying to the request for the resource to the source device by allocating a resource in an order of a resource having a lower interference through the scanning result IE of the source device and the scanning result IE of the target device.

According to an aspect of the present invention, there is provided a source device to reuse a space in a wireless communication system using a distributed MAC protocol, the device including: a pre-allocated resource information acquisition unit to obtain information about a pre-allocated resource of each communication channel through a beacon message received from adjacent devices; a measurement unit to measure a strength and an interference of a received signal corresponding to the resources of the communication channel; an information exchange unit to exchange a scanning result IE of the communication channel including measurement results of the strength and the interference of the received signal corresponding to the resources of the communication channel and the information about the pre-allocated resource of the communication channel with a source device; a channel selection unit to select a communication channel using the scanning result IE of the communication channel of the source device, the scanning result IE of the communication channel of the target device, and the information about the pre-allocated resource of the communication channel; and a resource allocation request unit to request a resource from the target device based on scanning result IE of the selected channel and information about a pre-allocated resource of the selected channel and to receive a resource allocation from the target device.

According to an aspect of the present invention, there is provided a target device to reuse a space in a wireless communication system using a distributed MAC protocol, the device including: a pre-allocated resource information acquisition unit to obtain information about a pre-allocated resource of each communication channel through a beacon message received from adjacent devices; a measurement unit to measure a strength and an interference of a received signal corresponding to the resources of the communication channel; an information exchange unit to exchange a scanning result IE of the communication channel including measurement results of the communication channel and the information about the pre-allocated resource of the communication channel with a source device; and a resource allocation reply unit to receive a request for a resource from the source device and allocating a resource to the source device.

According to an aspect of the present invention, there is provided a source device to reuse a space in a wireless communication system using a centralized MAC protocol, the device including: a pre-allocated resource information acquisition unit to obtain information about a pre-allocated resource through resource allocation information received from a central control unit; a measurement unit to measure a strength and an interference of a received signal corresponding to the resources; a measurement result transmission unit to transmit a scanning result IE including measurement results of the strength and the interference of the received signal corresponding to the resources to the central control unit; and a resource allocation request unit to request a resource from the central control unit and to receive a resource allocation from the central control unit in an order of a resource having a lower interference through the scanning result IE of the source device and a scanning result IE of a target device.

According to an aspect of the present invention, there is provided a central control unit to reuse a space in a wireless communication system using a centralized MAC protocol, the method including: a beacon broadcasting unit to broadcast a beacon message including resource allocation information; a measurement result identification unit to receive a scanning result IE including measurement results of a strength and an interference of a received signal corresponding resources from each of a source device and a target device; and a resource allocation reply unit to receive a request for a resource from the source device and to reply to the request for the resource to the source device by allocating a resource in an order of a resource having a lower interference through the scanning result IE of the source device and the scanning result IE of the target device.

As described above, an aspect of embodiments of the present invention enables maximum spatial reuse and allocation of optimal communication resources in resource request and allocation processes in a wireless communication system using a directional antenna by arranging an antenna with respect to a target device for communication before distributed devices request a resource for communication and by informing the target device or a central control unit in advance of a measurement result of a signal in MASs through the antenna.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 9 illustrate a configuration of a no-medium access slot (NoMAS) scanning result IE of a data channel without a superframe structure according to an embodiment of the present invention;

DETAILED DESCRIPTION

Figure 1:
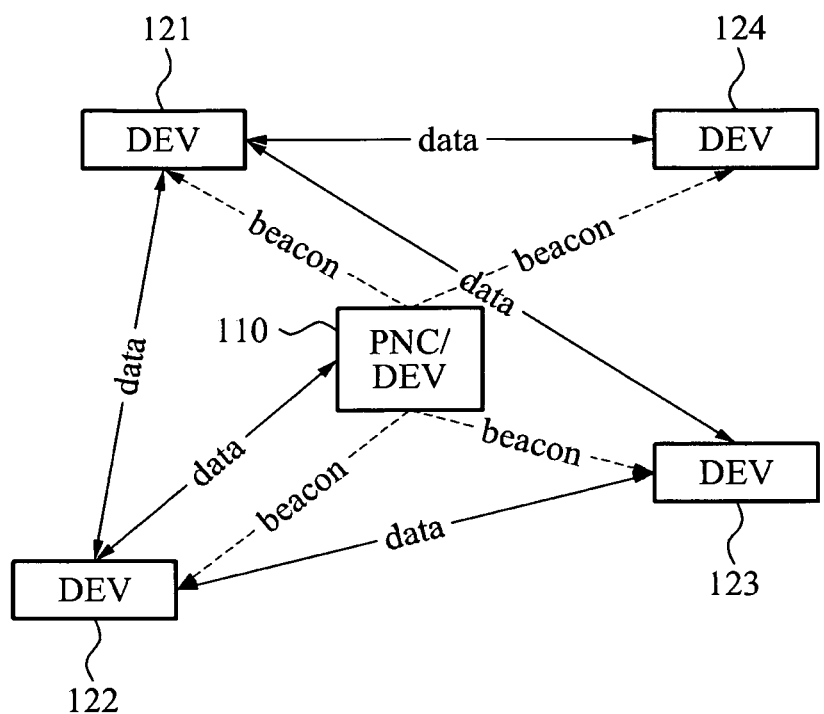
FIG. 1 illustrates a configuration of a system using a centralized medium access control (MAC) protocol.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Embodiments of the present invention relate to an apparatus and a method to improve a capacity of a system through spatial reuse in the wireless communication system using a directional antenna. The present invention may be applicable to all wireless apparatuses which realize a directional antenna using a beam formation technology or beam exchange technology and communicate therethrough.

A method of reusing a space by support of distributed devices in a wireless communication system using a directional antenna according to an embodiment of the present invention enables a millimeter-wave communication system using a wavelength measured in millimeters in a frequency band of 60 GHz. The millimeter-wave communication system may be classified into a centralized medium access control (MAC) protocol type and a distributed MAC protocol type depending on whether there is one central control unit to conduct allocation of a communication resource.

FIG. 1 illustrates a configuration of a system using a centralized MAC protocol.

Referring to FIG. 1, a piconet coordinator (hereinafter, referred to as PNC) 110 provides information about time synchronization and information about resource allocation to a plurality of devices (hereinafter, referred to as DEVs) 121, 122, 123, and 124 through a beacon message, and thus the DEVs 121, 122, 123, and 124 transmit and receive data with each other or with the PNC 110. The time synchronization and the resource allocation by the PNC 110 may be performed based on a superframe shown in FIG. 2.

Figure 2:
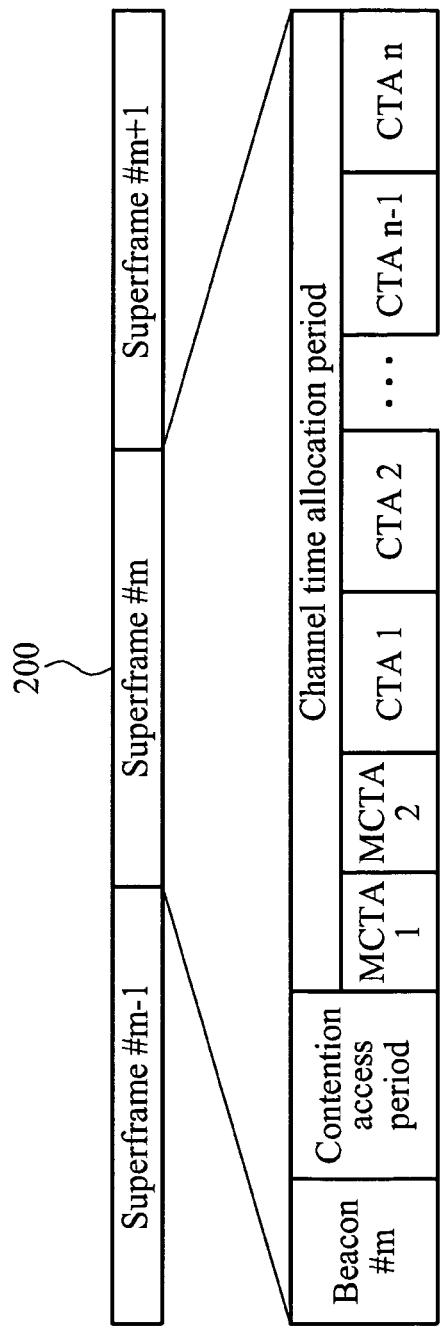
FIG. 2 illustrates a structure of a superframe operated in the system using the centralized MAC protocol.

FIG. 2 illustrates a structure of a superframe operated in the system using the centralized MAC protocol.

Referring to FIG. 2, the superframe 200 is constituted by a beacon period, a contention access period (CAP), and a channel time allocation period (CTAP). The beacon period is a period in which a beacon message is transmitted by the PNC 110 and includes a length of the superframe 200, a length of the CAP, a length of CTAP, information about channel allocation, and information about synchronization. The CAP transmits data in a competitive manner by a carrier sensing multiple access with collision avoidance (CSMA/CA). The CTAP is constituted by a plurality of channel time allocation (CTA) blocks to transmit and receive data without competition in a combination of a particular source and a destination. The CTA blocks are formed by that a particular source makes a request for a resource to the PNC 110 through the CAP and receives a reply to the request through a beacon message. The CTAP is partly formed of a management channel time allocation (MCTA) which is a section allocated for effective performance of a function provided by the CAP. However, the MCTA is not associated with the present invention, and thus description thereof is omitted. A plurality of CTAs of the CTAP are allocated in a time division multiple access (TDMA) by the PNC 110, and the CTAs for a particular source-destination combination are periodically allocated to the superframe in a scheme of one to many or many to one, or a predetermined number of CTAs are allocated over a plurality of superframes.

A system using a distributed MAC protocol does not have a central control unit such as the PNC device 110 of the system using the centralized MAC protocol shown in FIG. 1. Thus, devices in the system using the distributed MAC protocol individually transmit a beacon message and interpret information of beacon messages received from adjacent devices to perform synchronization and resource allocation. Devices using the distributed MAC protocol may be considered to communicate with each other in a structure of a superframe shown in FIG. 3.

Figure 3:
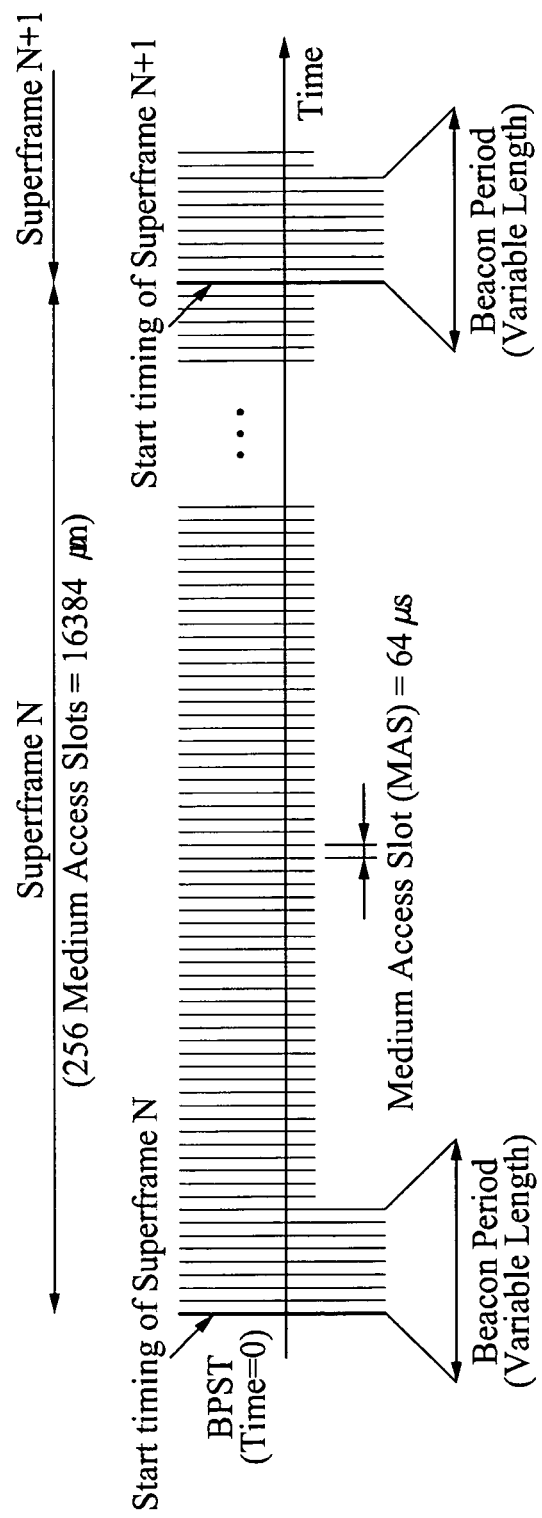
FIG. 3 illustrates a structure of a superframe for a time division multiple access (TDMA) in a distributed ad-hoc network.

FIG. 3 illustrates a structure of a superframe for a TDMA in a distributed ad-hoc network.

Referring to FIG. 3, the superframe is constituted by medium access slots (MASs) with a predetermined length and divided into 256 MASs. The MASs constituting the superframe is largely divided into a beacon period and a data exchange period. The beacon period is constituted by initial MASs of the superframe, and devices to form respective nodes transmit a beacon message including information about MAC of the devices using the initial MASs. The remaining MASs are used for data exchange. The distributed MAC protocol enables each device to reserve particular MASs using the beacon message and provides that reserved MASs may be used by only a reserving device.

Figure 4:
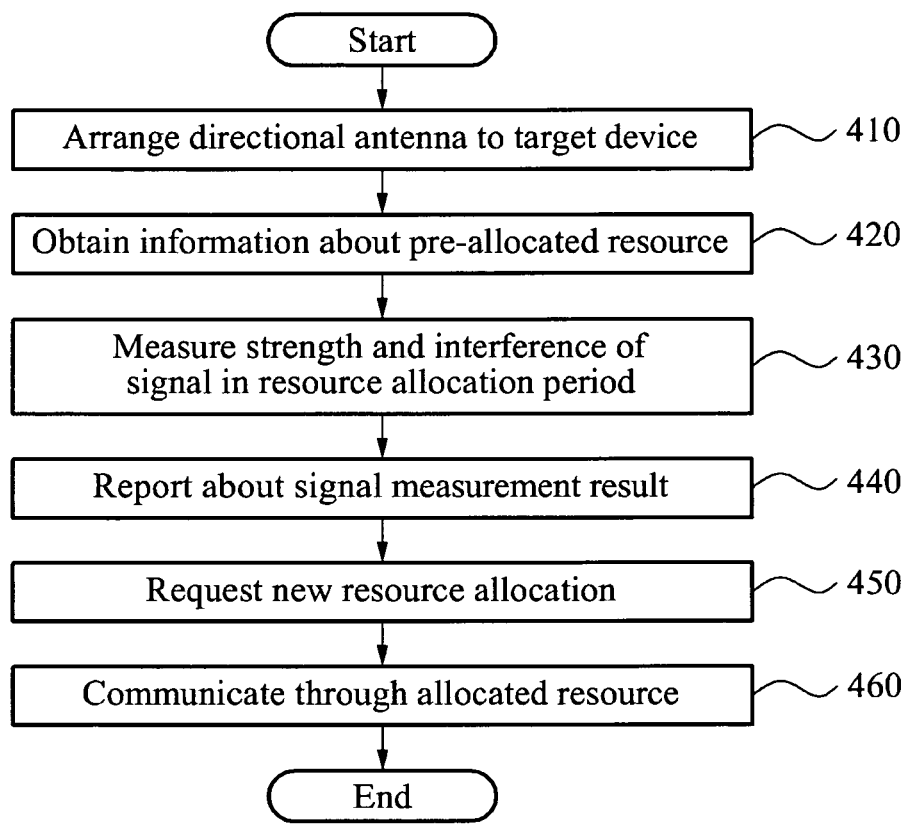
FIG. 4 is a flowchart illustrating a process of a source device setting a communication to support spatial reuse according to an embodiment of the present invention.

FIG. 4 is a flowchart illustrating a process of a source device setting a communication to support spatial reuse according to an embodiment of the present invention.

The source device (terminal) to enable spatial reuse uses a directional antenna through a beam formation technology or beam exchange technology.

Referring to FIG. 4, the source device arranges a directional antenna through a beam formation process or beam exchange process with a target device in operation 410. Then, the source device obtains information about a pre-allocated resource in operation 420. Here, the information about the pre-allocated resource may include a time period, a frequency, a code, or a combination thereof. However, in the present embodiment, the information about the pre-allocated resource is limited to only a time period in a communication channel using a predetermined frequency.

The obtaining of the information about the pre-allocated resource in operation 420 may be different depending on when a centralized MAC protocol is used and when a distributed MAC protocol is used.

When the centralized MAC protocol is used, a single central control unit (an access point (AP) of a wireless local area network (WLAN) or a PNC of a wireless personal area network (WPAN)) broadcasts resource allocation information to all devices. Thus, the source device receives the information about the resource allocation transmitted by the central control unit or the PNC to perform the obtaining of the information about the pre-allocated resource in operation 420.

When the distributed MAC protocol is used, all devices transmit a beacon message, and each beacon message includes information about a resource used by a transmitting device. Thus, the source device receives a beacon message from adjacent devices to perform the obtaining of the information about the pre-allocated resource in operation 420.

When the obtaining of the information about the pre-allocated resource is completed in operation 420, the source device determines an available time period and estimates whether spatial reuse is possible by measuring a strength and an interference of a signal in resource allocation periods in operation 430.

When using the distributed MAC protocol in operation 430, the source device may need to measure a strength and an interference of a signal in all time periods without being limited to the information about the pre-allocated resource obtained in operation 420, since the source device using the distributed MAC protocol may not receive all beacon messages transmitted by the adjacent devices. Further, when using the centralized MAC protocol, the source device may need to measure a strength and an interference of a signal even in a non-allocated time period, since signal interference may occur in the non-allocated time period due to influence of interference between piconets using the same protocol and interference by a different system although the central control unit can transmit resource allocation information to all devices as the central control unit manages all resource allocation information.

When completing the measuring in operation 430, the source device reports about a measurement result measured by time periods in operation 440. Here, the source device reports about the measurement result to the central control unit in the centralized MAC protocol, and reports about the measurement result to a target device in the distributed MAC protocol.

The source device requests resource allocation for communication of the source device in operation 450. Here, the source device requests the resource allocation from the central control unit in the centralized MAC protocol, and requests the resource allocation from adjacent devices including the target device in the distributed MAC protocol.

Then, the source device receives an approval of the resource allocation from the central control unit or the target device and starts communication in operation 460.

A device to form the information about the pre-allocated resource information, a distributed reservation protocol (DRP) availability information element (IE), displays MASs used by other adjacent devices and MASs not used by the other adjacent devices in a maximum of 256 bits based on MAS allocation information included in the beacon messages received from the adjacent devices.

Here, although not receiving a beacon message from a particular device, a receiving device may encounter substantial interference by a signal transmitted by the particular device and signals transmitted by the adjacent devices. Thus, the device according to the present embodiment may need to measure a strength and an interference of a signal in each MAS of the superframe shown in FIG. 3.

Further, communication is performed by a pair of devices of a transmitting device and a receiving device. Thus, the transmitting device and the receiving device respectively measures a strength and an interference of a signal in each MAS and exchanges measurement results in order to guarantee a high quality of a communication signal. That is, the transmitting device and the receiving device may determine MASs available for communication through a strength and an interference of a received signal measured in each MAS by each of the transmitting device and the receiving device which are involved in communication.

In the present embodiment, message information to exchange a strength and an interference of a received signal measured in a superframe is named a scanning result information element (IE) and is formed to be exchanged between devices involved in communication.

Figure 5:
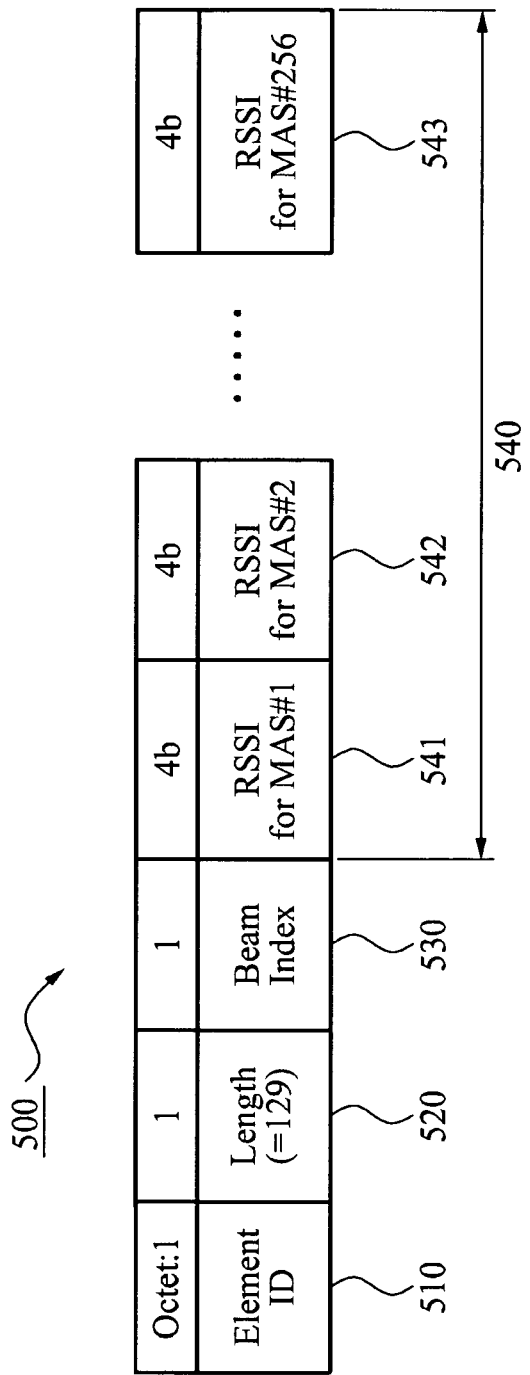
FIG. 5 illustrates a configuration of a scanning result information element (IE) according to an embodiment of the present invention.

FIG. 5 illustrates a configuration of a scanning result information IE according to an embodiment of the present invention.

Referring to FIG. 5, the scanning result IE 500 may include an element identification (ID) 510 to represent the scanning result IE 500, a length 520 to represent a length of the scanning result IE 500, a beam index 530 to represent a directional beam used for measuring a signal, and measurement result information 540.

Here, the measurement result information 540 includes 256 measurement results of respective MASs 541, 542, and 543 forming a superframe. Here, the measurement results of the respective MASs 541, 542, and 543 are displayed in 4 bits, respectively. The measurement results of the respective MASs 541, 542, and 543 use a received signal strength indicator (RSSI), but may use various measured values such as a signal energy level, a signal-to-noise ratio, and the like depending on an embodiment.

Figure 6:
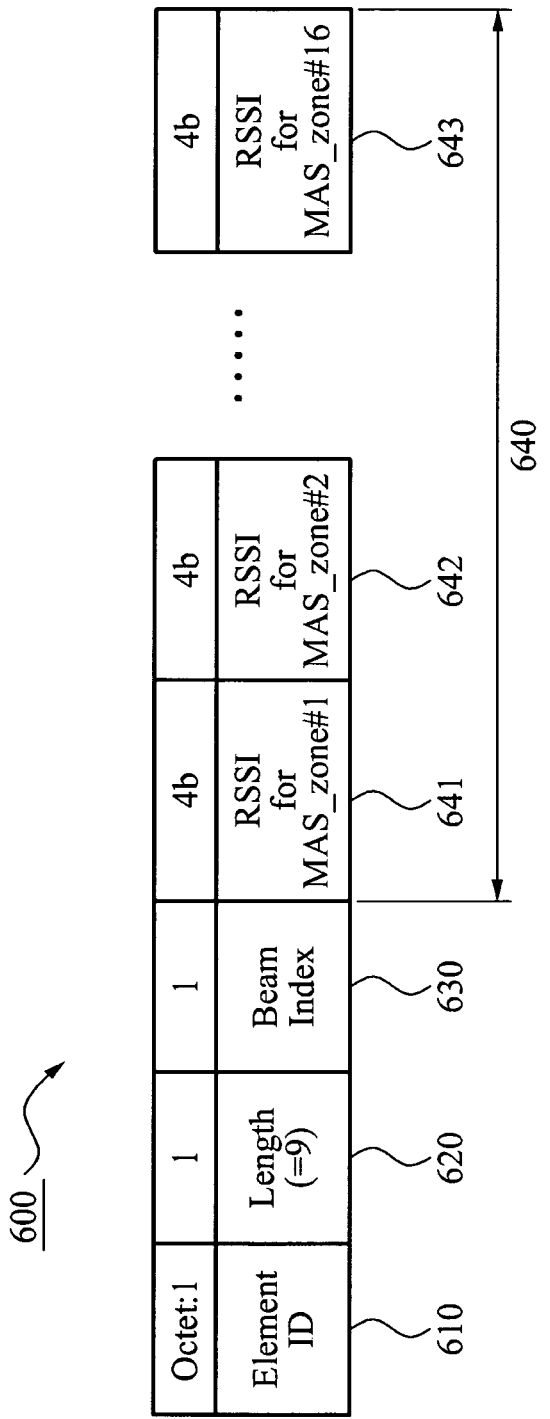
FIG. 6 illustrates a configuration of a scanning result IE according to another embodiment of the present invention.

FIG. 6 illustrates a configuration of a scanning result IE according to another embodiment of the present invention. FIG. 6 shows another example of the scanning result IE used to decrease a number of bits of the scanning result IE. Referring to FIG. 6, the scanning result IE 600 may include an element ID 610 to represent the scanning result IE 600, a length 620 to represent a length of the scanning result IE 600, a beam index 630 to represent a directional beam used for measuring a signal, and measurement result information 640.

Here, the measurement result information 640 includes measurement results of respective MAS zones 641, 642, and 643 in 4 bits. Here, an MAS zone is formed of 16 successive MASs. A superframe may be divided into 16 MAS zones in total.

Figure 7:
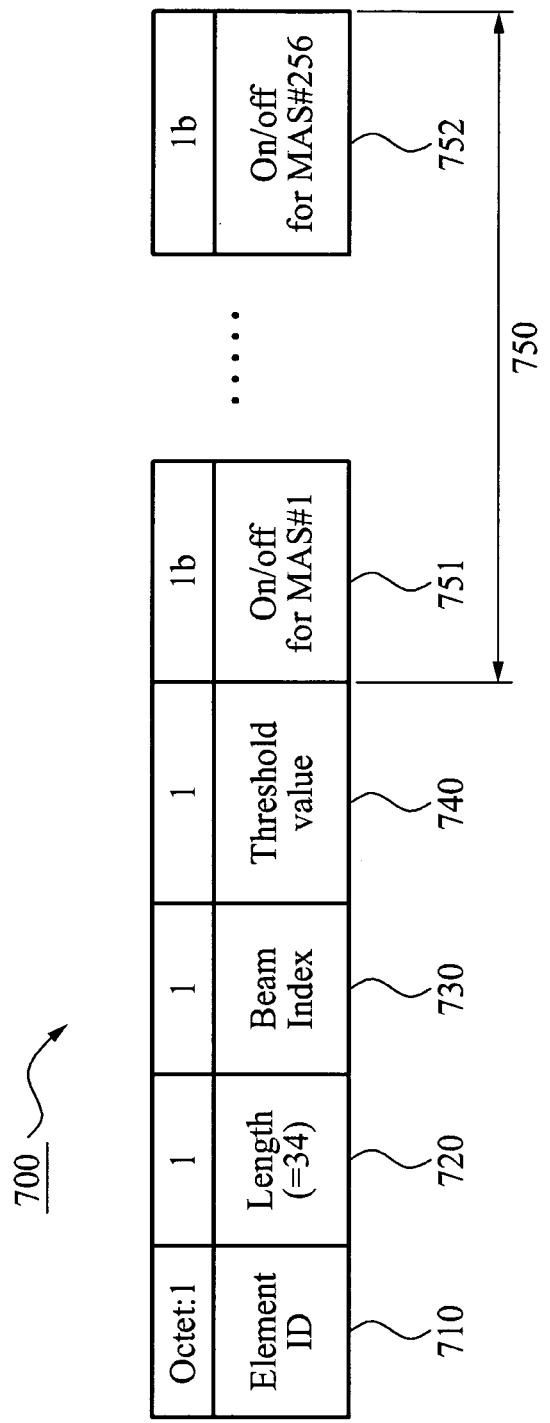
FIG. 7 illustrates a configuration of a scanning result IE according to still another embodiment of the present invention.

FIG. 7 illustrates a configuration of a scanning result IE according to still another embodiment of the present invention.

Referring to FIG. 7, the scanning result IE 700 may include an element ID 710 to represent the scanning result IE 700, a length 720 to represent a length of the scanning result IE 700, a beam index 730 to represent a directional beam used for measuring a signal, a threshold value 740 to determine an on and an off of a measurement result, and measurement result information 750.

Here, the measurement result information 750 includes measurement results of respective MASs 751 and 752 obtained by comparing measured values of respective 256 MASs forming a superframe with the threshold value 740 and displayed in on and off, respectively.

Figure 8:
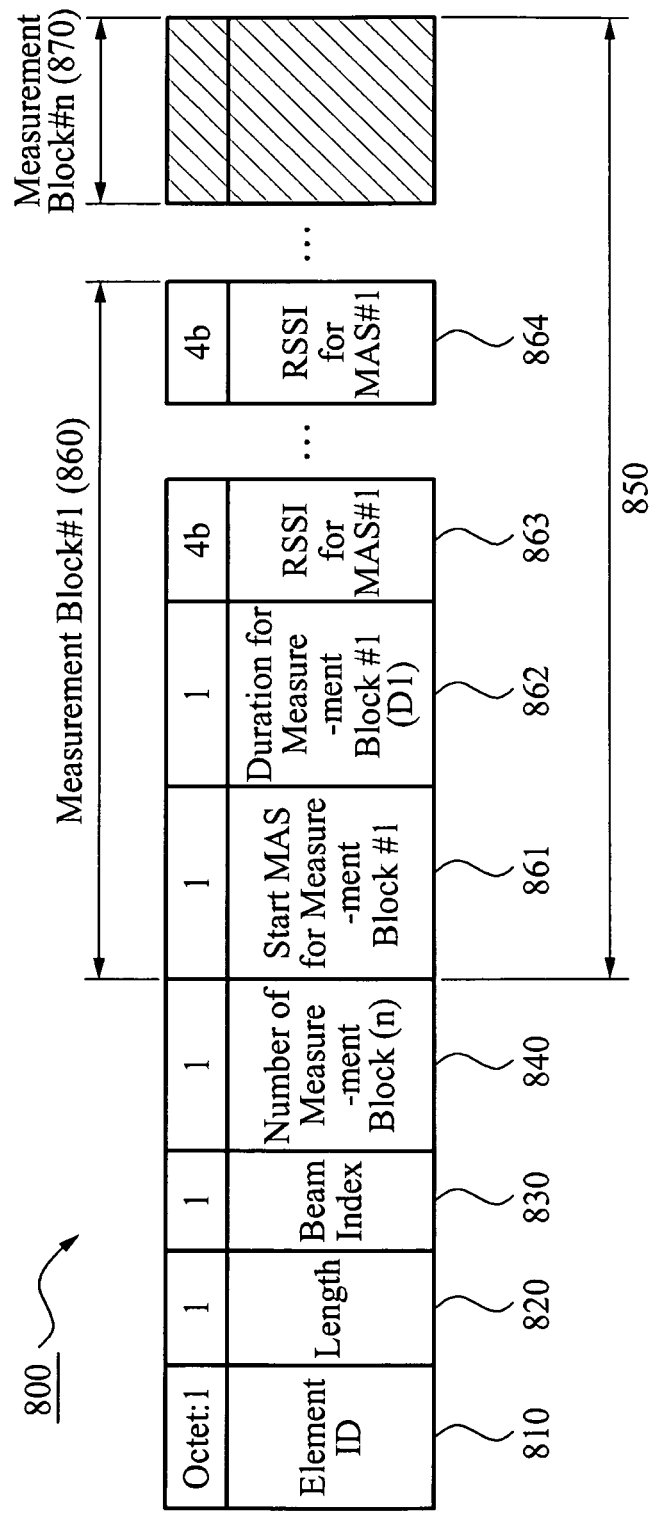
FIG. 8 illustrates a configuration of a scanning result IE according to further another embodiment of the present invention.

FIG. 8 illustrates a configuration of a scanning result IE according to further another embodiment of the present invention. FIG. 8 shows an example of the scanning result IE to represent a strength and an interference of a received signal in a plurality of measurement blocks which are selective measurement periods instead of measuring all period of a superframe. Here, time periods which are not involved in the scanning result IE may be displayed to have a superior state of channels or an inferior state of channels.

Referring to FIG. 8, the scanning result IE 800 may include an element ID 810 to represent the scanning result IE 800, a length 820 to represent a length of the scanning result IE 800, a beam index 830 to represent a directional beam used for measuring a signal, a number of measurement blocks 840 to represent a number of measurement blocks involved in the scanning result IE 800, and measurement result information 850.

Here, the measurement result information 850 may include at least one measurement block 860 and 870. Each measurement block 860 includes a start MAS for a measurement block 861 to represent a start point, a duration for a measurement block 862 to represent a length of a measurement period of the measurement block 860 in an MAS unit, and RSSIs for MASs 863 and 864 to represent a strength and an interference of a received signal corresponding to each MAS forming the measurement block 860. Here, RSSIs for MASs 863 and 864 included in one measurement block 860 are RSSs of successive MASs.

Hitherto, a case where data channels scanned form a superframe structure shown in FIG. 3 has been described. However, a superframe structure is formed only when there is a communication device identified by a device to scan a corresponding data channel. In other words, when a communication device does not transmit a beacon message in a data channel scanned by a device, a superframe structure may not be identified, and thus measurement in an MAS unit may be impossible. Further, a DRP availability IE may not be constituted. Here, an interference signal may also exist in the scanned channel, and thus a channel state regarding whether the interference signal exists may be displayed.

A method of constituting a scanning result IE for a data channel without a superframe structure may include a method of defining a new scanning result IE with the different element IDs 510, 610, 710, and 810 of the IEs and a method of distinguishing the same element IDs of the scanning result IEs shown in FIGS. 5 to 8 by a field value coding.

FIG. 9 illustrate a configuration of a no-MAS (NoMAS) scanning result IE of a data channel without a superframe structure according to an embodiment of the present invention.

Referring to FIG. 9, the NoMAS scanning result IE 900 may include an element ID 910 to represent the NoMAS scanning result IE 900, a length 920 to represent a length of the NoMAS scanning result IE 900, a beam index 930 to represent a directional beam used for measuring a signal, and measurement result information 940.

Here, there is no superframe structure divided into MASs, and thus the measurement result information 940 is an average RSSI in a predetermined measurement time.

Figure 10:
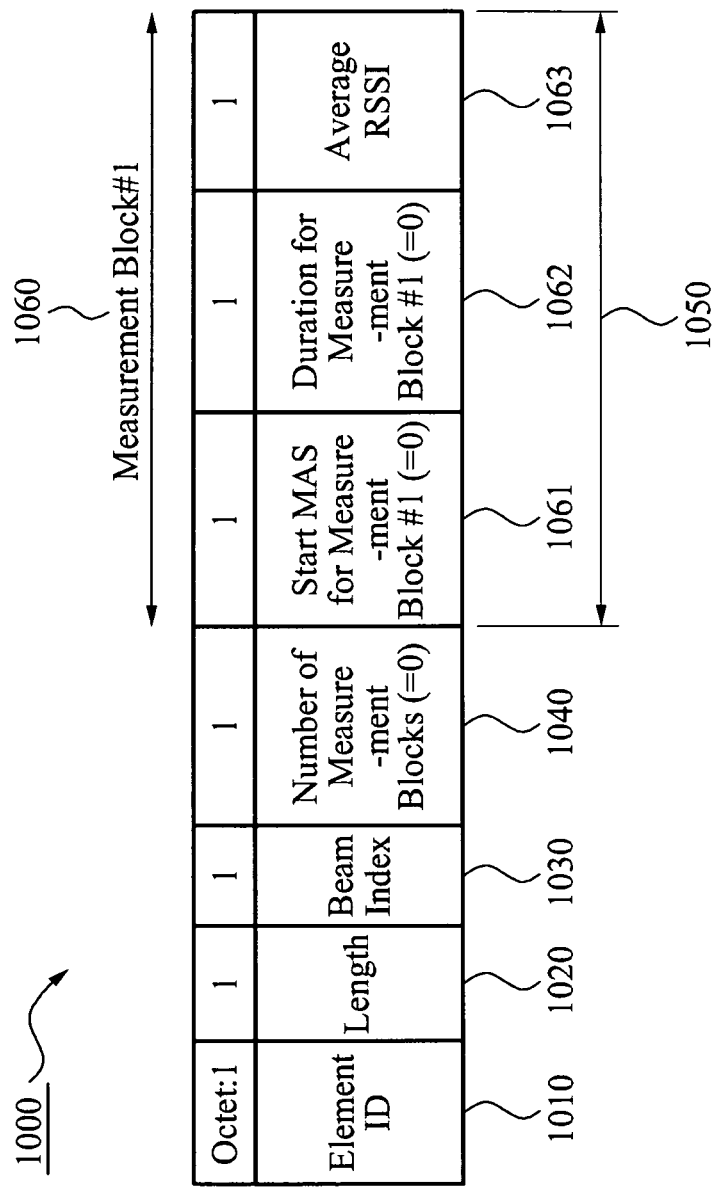
FIG. 10 illustrates a configuration of a scanning result IE of a data channel without a superframe structure according to an embodiment of the present invention.

FIG. 10 illustrates a configuration of a scanning result IE of a data channel without a superframe structure according to an embodiment of the present invention. FIG. 10 shows the scanning result IE of the data channel without the superframe structure formed using the scanning result IE in FIG. 8. Referring to FIG. 10, the scanning result IE 1000 may include an element ID 1010 to represent the scanning result IE 1000, a length 1020 to represent a length of the scanning result IE 1000, a beam index 1030 to represent a directional beam used for measuring a signal, a number of measurement blocks 1040 to represent the number of measurement blocks included in the scanning result IE 800, and measurement result information 1050.

Here, the scanning result IE 1000 is a configuration for the data channel without the superframe, and the number of measurement blocks 1040 has a value of 0. The measurement result information 1050 includes one measurement block 1060.

The measurement block 1060 includes a start MAS for a measurement block 1061 to represent a start point, a duration for a measurement block 1062 to represent a length of a measurement period of the measurement block 1060, and an average RSSI 1063 in a predetermined measurement time. Here, the start MAS for the measurement block 1061 and the duration for the measurement block 1062 have a value of 0 to express the scanning result IE of the data channel without the superframe.

The scanning result IEs and the NoMAS scanning result IE described in FIGS. 5 to 10 are illustrative examples and may be constituted variously to include channel state information intended by the present invention.

Figure 11:
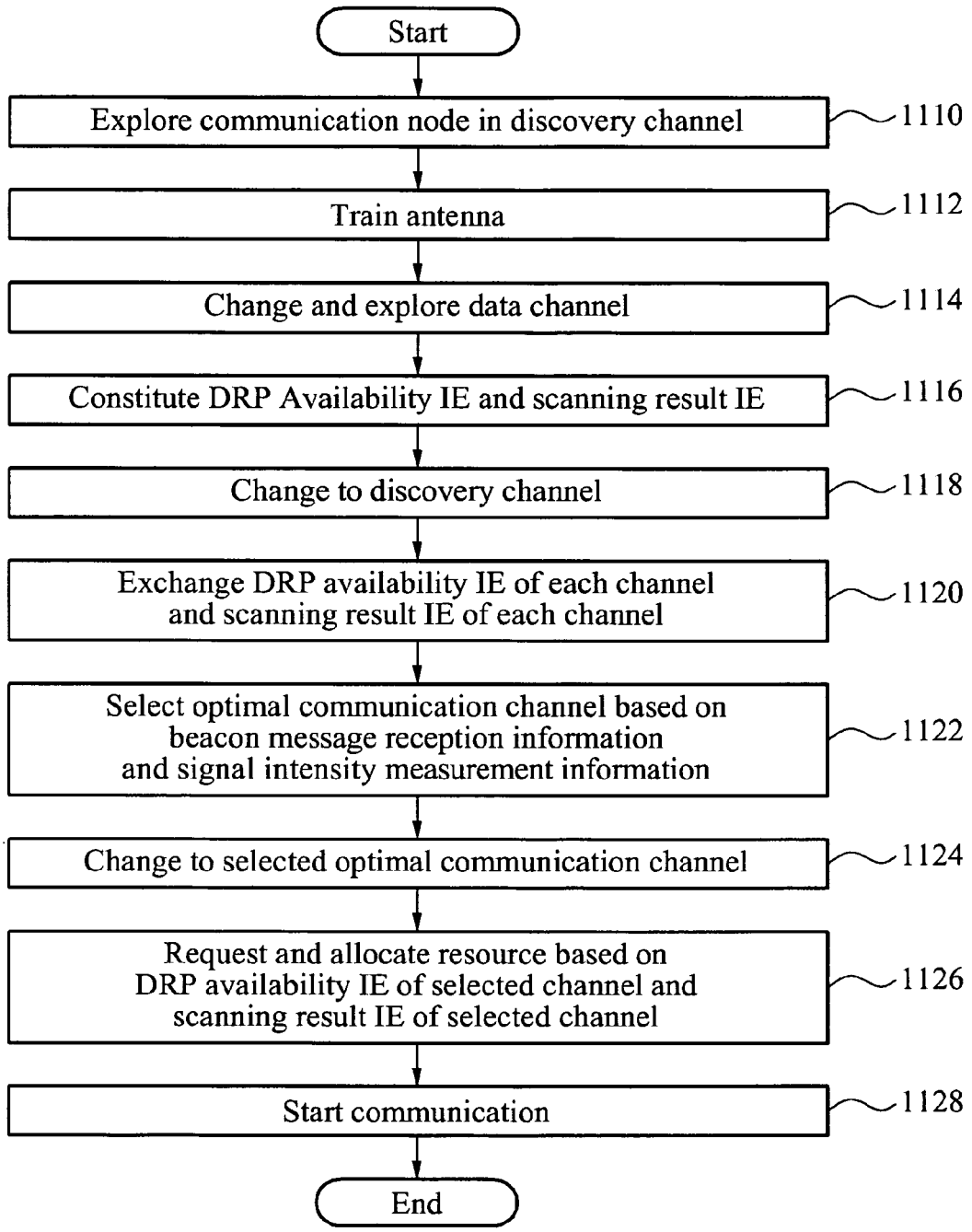
FIG. 11 is a flowchart illustrating a process of setting communication to support spatial reuse in a wireless communication system using a distributed MAC protocol according to an embodiment of the present invention.

FIG. 11 is a flowchart illustrating a process of setting communication to support spatial reuse in a wireless communication system using a distributed MAC protocol according to an embodiment of the present invention.

Referring to FIG. 11, a source device of the wireless communication system explores devices to be a communication target through a discovery channel in operation 1110. When searching for a communication device in operation 1110, the source device and a target device of the wireless communication system arrange antennas through an antenna training process to guarantee an optimal communication quality in operation 1112.

Then, the source device and the target device change to one or more data channels and explore a data channel to be available in order to determine a channel for data communication in operation 1114. The source device and the target device constitute a DRP availability IE by receiving beacon messages from devices which have already communicated through the data channels in operation 1114 and constitute a scanning result IE through measurement of a strength and an interference of a received signal. Here, the DRP availability IE represents information about a pre-allocated resource, and the scanning result IE represents a measurement result of a received signal corresponding to an MAS or MAS zone to form a superframe. The scanning result IE may be constituted in the forms shown in FIGS. 5 to 8.

Operation 1116 and operation 1118 may be repeated in one or more data channels.

When completing the exploration of a data channel, the source device and the target device change to a discovery channel in operation 1118, and exchange a DRP availability IE of each channel and a scanning result IE of each channel with each other in operation 1120.

The source device and the target device select a channel having the most MAS resources which are available and optimal for communication through the exchange of the DRP availability IE of each channel and the scanning result IE of each channel in operation 1122. Here, an MAS which is available and optimal for communication denotes an MAS in a higher rank as shown in the following Table 1. Here, an MAS in the fourth rank is not considered to be an optimal MAS for communication. Further, a threshold value of the scanning result IE may be determined in multiple levels, and thus more ranks may be generated.

Table 1 shows a standard to determine an optimal MAS based on the DRP availability IE and the scanning result IE according to the present embodiment.

TABLE 1

| Rank | DRP availability IE | Scanning result IE |
|---|---|---|
| 1 | Available MAS | MAS having a measured interference not exceeding a threshold value |
| 2 | Unavailable MAS | MAS having a measured interference not exceeding a threshold value |
| 3 | Available MAS | MAS having a measured interference exceeding a threshold value |
| 4 | Unavailable MAS | MAS having a measured interference exceeding a threshold value |

The source device and the target device change to an optimal channel selected in operation 1122 in operations 1124. The source device of the wireless communication system selects optimal MASs for communication in the selected channel based on the DRP availability IE and the scanning result IE to request resource allocation from the target device and receives an approval of the resource allocation from the target device in operation 1126. In operation 1126, the source device may request the selected MASs to be a resource through a beacon message, and the target device may approve allocation of the MASs requested to be the resource through a beacon message. Then, the source device and the target device start communication in operation 1128.

Meanwhile, the target device receiving a resource request additionally measures a strength and an interference of a received signal in the MASs which the source device requests for a resource. Further, the target device constitutes a scanning result IE using additionally measured results and feedbacks the scanning result IE to the source device. A resource request transmitting device may determine optimal MASs again based on the scanning result IE received from the target device.

Operation 1126 in FIG. 11 may be repeated in order to form a new communication link with adjacent devices in the channel selected in operation 1122. Here, the scanning result IE constituted in operation 1116 may not include a state of the channel at a point when a link is generated with a lapse of time. Thus, a scanning result IE is formed by resource request and allocation processes at a point when a communication link is generated, and is exchanged between the source device and the target device.

Hereinafter, a method of requesting and allocating a resource according to an embodiment of the present invention will be described with reference to FIGS. 12, 13, and 14.

In a wireless communication system using a distributed protocol, a source device and a target device which form a communication link may request and allocate a resource through a beacon message which the source device and the target device transmit. Further, the source device and the target device may request and allocate a resource through an exchange of a resource reservation request message and a resource reservation reply message, as opposed to a beacon message, thereby setting a communication link.

Figure 12:
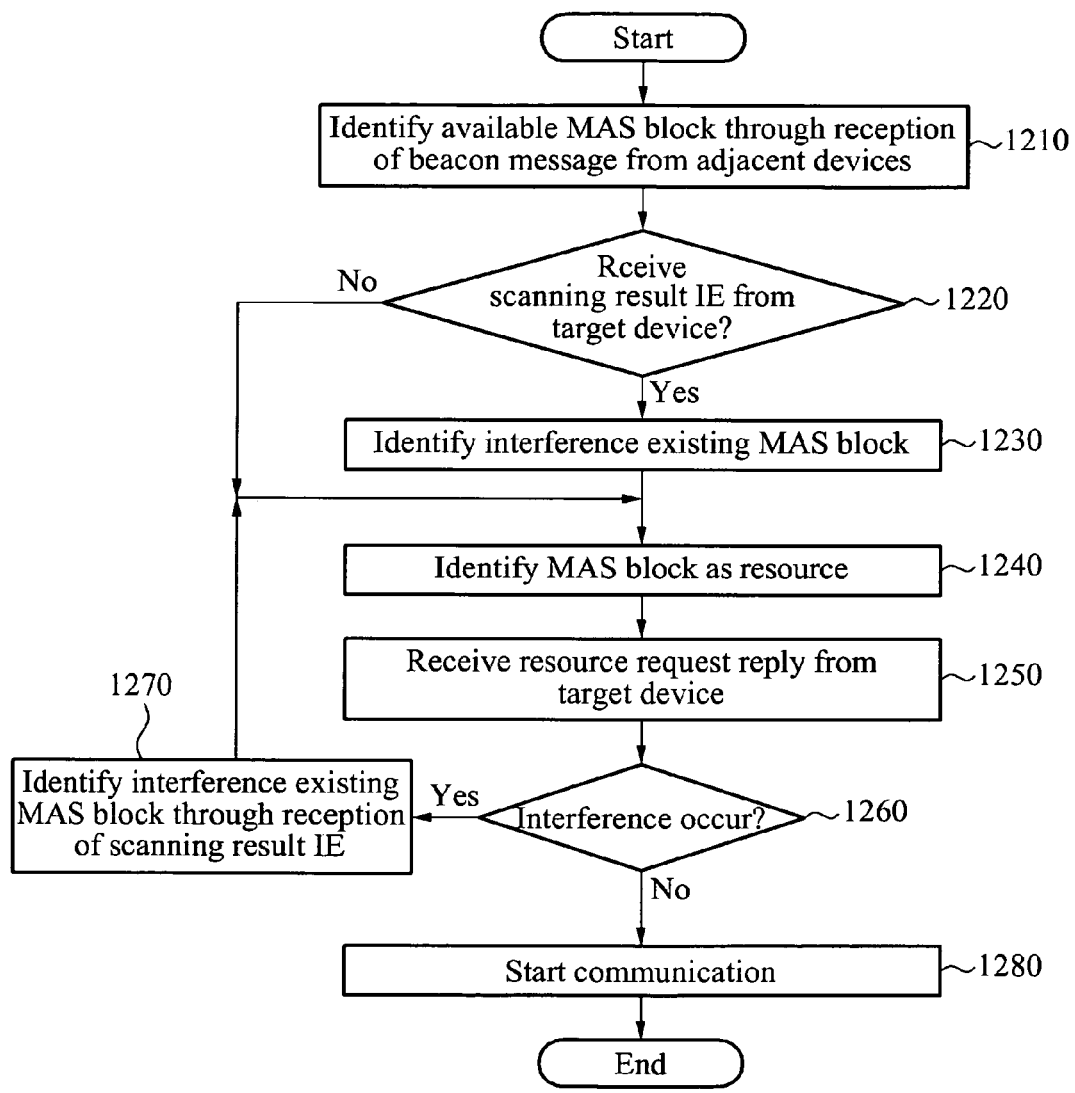
FIG. 12 is a flowchart illustrating a process of a source device requesting resource allocation according to an embodiment of the present invention.

FIG. 12 is a flowchart illustrating a process of a source device requesting resource allocation according to an embodiment of the present invention.

Referring to FIG. 12, the source device receives beacon messages from adjacent devices to identify MASs used by the adjacent devices included in the beacon message and to identify MASs which are not used by neighbor devices in operation 1210. That is, the source device constitutes a DRP availability IE in operation 1210.

Then, the source device identifies whether a beacon message received from the target device includes a scanning result IE in operation 1220.

As a result of the identification in operation 1220, when the beacon message does not include a scanning result IE, the source device requests part or all of available MASs identified in operation 1210 for a resource from the target device in operation 1240.

However, when the beacon message includes a scanning result IE, the source device identifies an interference in the MASs measured by the target device through the scanning result IE in operation 1230.

In operation 1240, the source device selects MASs which are available and have a low interference and requests the MASs for a resource based on the available MASs identified in operation 1210 and an interference of each MAS identified in operation 1230. Here, the source device may request a resource through a beacon message including resource request information or a separate resource request message.

After requesting a resource in operation 1240, the source device receives a reply to the resource request from the target device in operation 1250. Here, the reply to the resource request in operation 1250 may be made to the target device through a beacon message when the source device transmits the resource request through a beacon message. When the source device requests the resource through a resource request message, the target device replies through a resource reply message.

When receiving the reply to the resource request, the source device identifies the reply to the resource request and identifies whether interference occurs in a requested resource in operation 1260.

As a result of the identification in operation 1260, when interference occurs, the source device identifies MASs in which interference occurs through a scanning result IE included in the reply to the resource request in operation 1270. Then, the source device repeats operation 1240 to request MASs again which are available and do not have interference.

In addition, when interference does not occur so that the resource request is determined to be approved, the source device determines that requested resources are allocated and starts data communication through the allocated resources in operation 1280.

Figure 13:
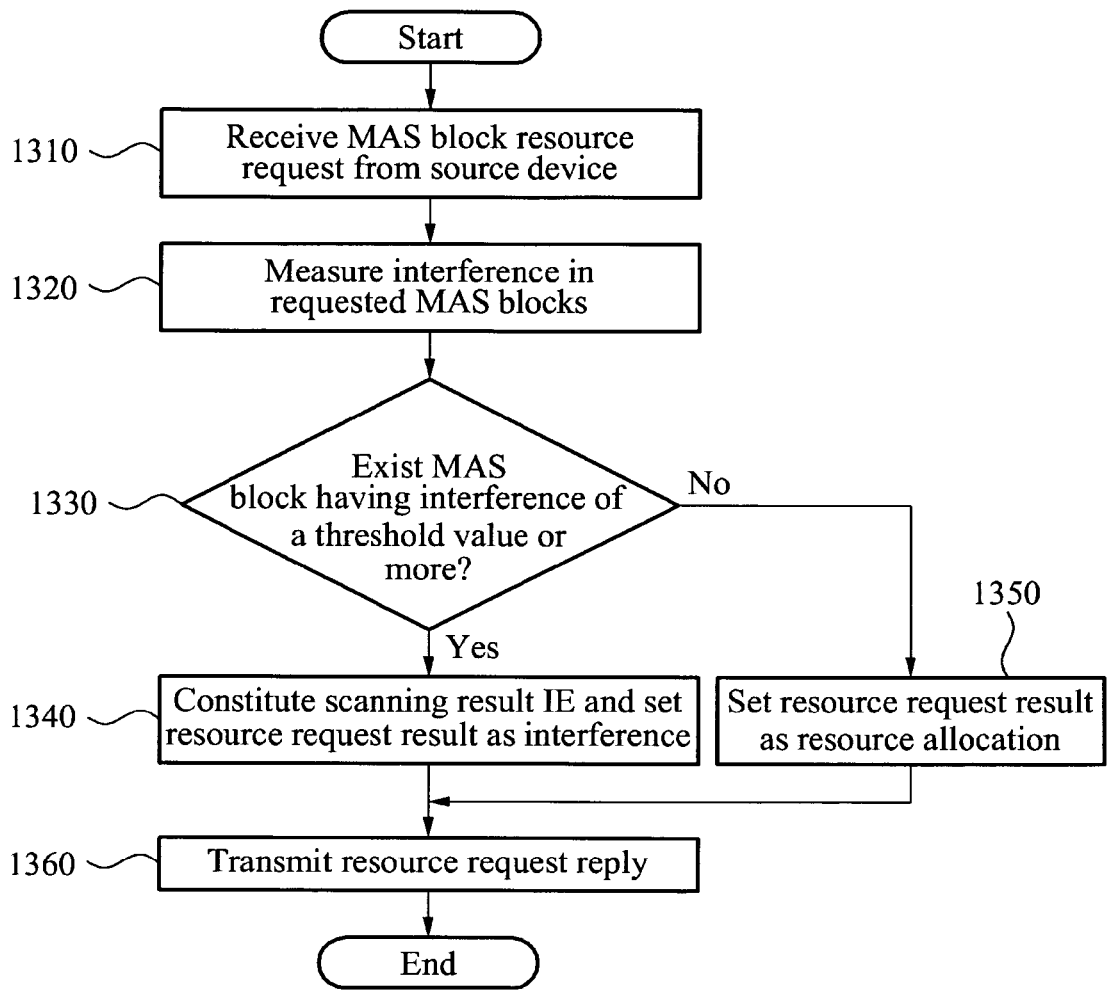
FIG. 13 is a flowchart illustrating a process of a target device replying to resource allocation according to an embodiment of the present invention.

FIG. 13 is a flowchart illustrating a process of a target device replying to resource allocation according to an embodiment of the present invention.

Referring to FIG. 13, the target device receives a resource request of MAS blocks from a source device in operation 1310. The target device measures an interference of a signal in requested MAS blocks in operation 1320.

As a result of the measurement, the target device identifies whether there is an MAS in which an interference of a threshold value or more occurs to cause an obstacle in communication in operation 1330.

In operation 1330, when an MAS having an interference of the threshold value or more exists, the target device constitutes a scanning result IE based on an interference measurement result and represents a result of the resource request as occurrence of interference.

In operation 1330, when an MAS having an interference of the threshold value or more does not exist, the target device sets a result of the resource request as resource allocation in operation 1350.

After operation 1340 or operation 1350, the target device transmits a reply to the resource request to the source device through a beacon message or a resource reply message in operation 1360. Here, when a result of the resource request is set as interference, the target device transmits the reply to the resource request including the scanning result IE. FIG. 14 illustrates a configuration of a resource request reply message according to an embodiment of the present invention.

Figure 14:
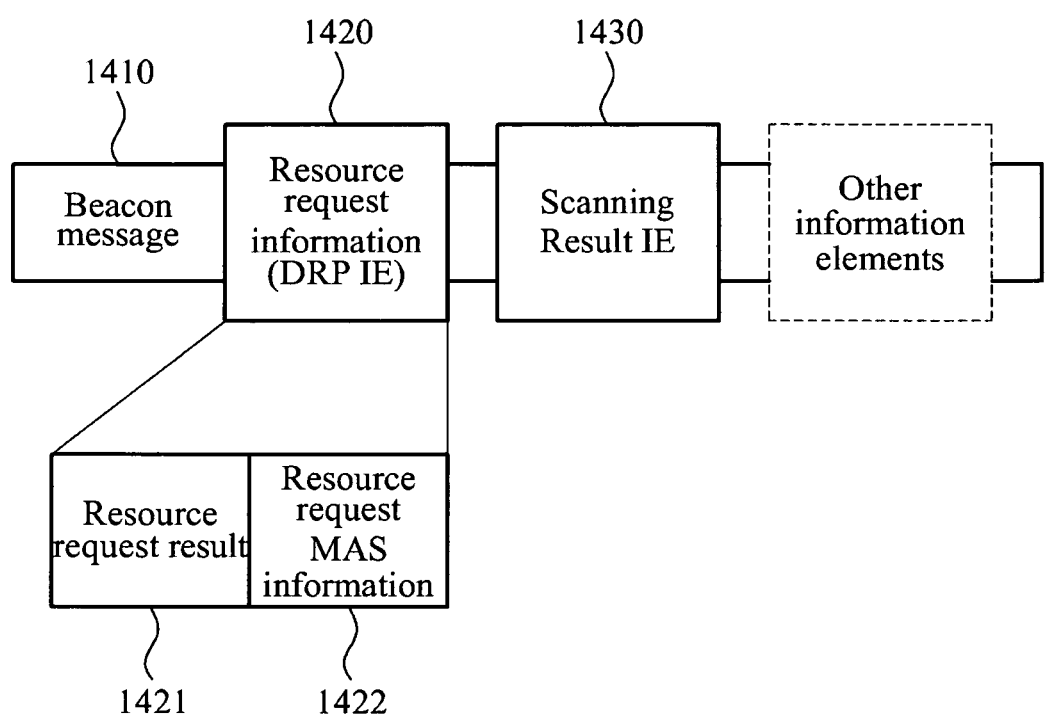
FIG. 14 illustrates a configuration of a resource request reply message according to an embodiment of the present invention.

FIG. 14 is an example to constitute the resource request replay message 1410 through a beacon message, and the resource request replay message 1410 may include a resource request information 1420 transmitted by a source device and a scanning result IE 1430 and may further include other information elements, which are not associated with embodiments of the present invention.

Here, the resource request information 1420 is information included in a beacon message or a resource request message transmitted by the source device for resource request and includes position information of MASs 1422 used in the resource request and a resource request result field 1421 to report about a result of the resource request by a target device. The resource request result field 1421 is a field which is not used when the source device requests a resource. When a value of the resource request result field 1421 is expressed as interference, a scanning result IE 1430 including information about an MAS in which interference occurs and information to represent an interference is included in a beacon message. The scanning result IE 1430 may be omitted when a value of the resource request result field 1421 is not interference.

A device using a centralized MAC protocol also arranges an antenna with respect to a target device for communication, constitutes a scanning result IE shown in FIGS. 5 to 8, and reports about the scanning result IE to a central control unit. The central control unit may determine an order of priority in allocation of MASs depending on each device and each beam index of a device based on the scanning result IE and performs resource allocation based on the order of priority in allocation of MASs collected through the scanning result IE and information about two devices to use a resource when there is a request for the resource from a device. Here, a beam index may be used instead of an address of the target device for communication.

Hereinafter, a configuration of a wireless communication system using a directional antenna which provides a spatial reuse method performed as above according to an embodiment of the present invention is described with reference to FIG. 15.

Figure 15:
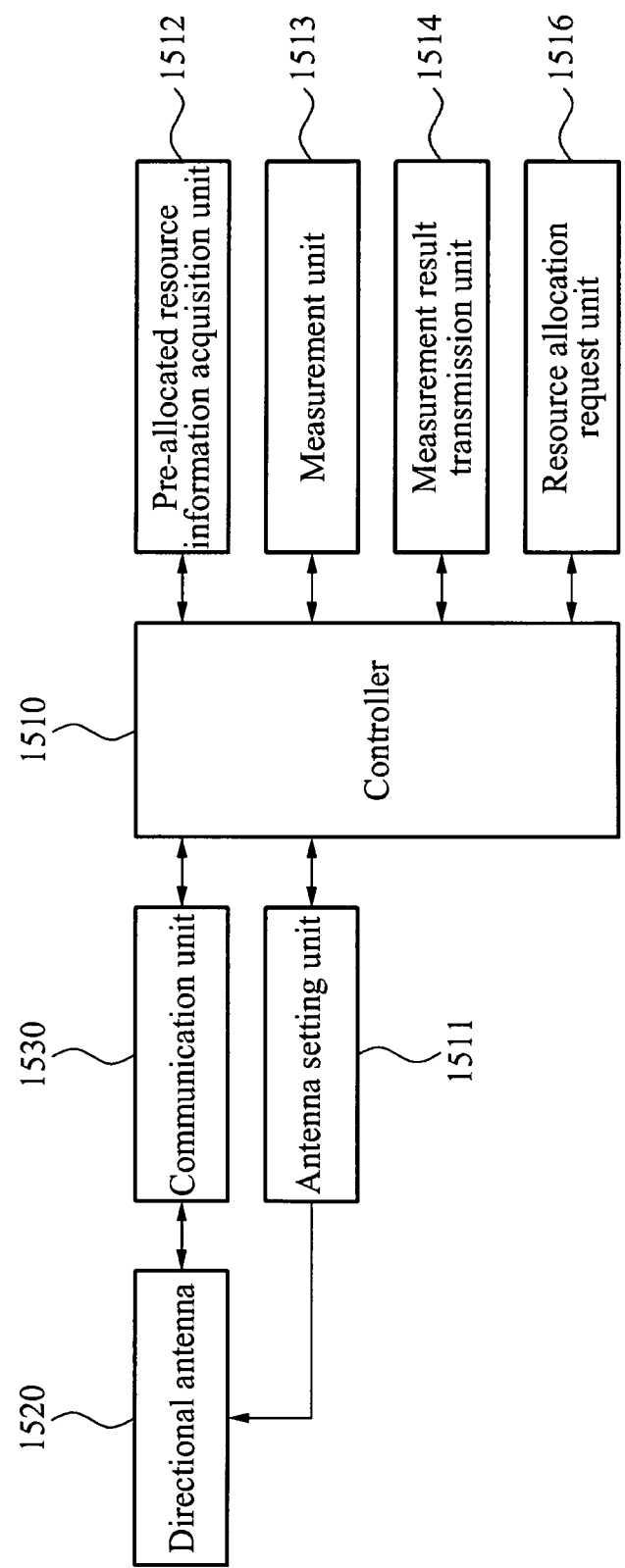
FIG. 15 illustrates a configuration of a source device to support spatial reuse in a wireless communication system using a centralized MAC protocol according to an embodiment of the present invention.

FIG. 15 illustrates a configuration of a source device to support spatial reuse in a wireless communication system using a centralized MAC protocol according to an embodiment of the present invention.

Referring to FIG. 15, the source device includes a controller 1510, an antenna setting unit 1511, a pre-allocated resource information acquisition unit 1512, a measurement unit 1513, a measurement result transmission unit 1514, a resource allocation request unit 1516, a directional antenna 1520, and a communication unit 1530.

The directional antenna 1520 is an antenna to enable a radiation pattern of a beam to face in an optional direction.

The communication unit 1530 transmits and receives data wirelessly with a central control unit, an adjacent device, and a target device. The communication unit 1530 decreases a wireless frequency signal received through the directional antenna 1520 to despread and channel-decode the received signal when receiving a signal, and the communication unit 1530 channel-codes and spreads data and increases a frequency to transmit the data through the directional antenna 1520 when transmitting data.

The antenna setting unit 1511 arranges the directional antenna 1520 to guarantee an optimal quality of communication through an antenna training process with the target device.

The pre-allocated resource information acquisition unit 1512 receives resource allocation information from the central control unit and identifies information about pre-allocated resources which are already allocated and so are not available through the resource allocation information. Here, the resource allocation information may be received, being included in a beacon message broadcasted by the central control device.

The measurement unit 1513 measures a strength and an interference of a received signal corresponding to resources.

The measurement result transmission unit 1514 generates a scanning result IE including measurement results and transmits the scanning result IE to the central control unit.

The resource allocation request unit 1516 requests a resource for communication from the central control unit and receives a resource allocation.

The controller 1510 controls the source device overall and may perform functions of the antenna setting unit 1511, the pre-allocated resource information acquisition unit 1512, the measurement unit 1513, the measurement result transmission unit 1514, and the resource allocation request unit 1516. In the present embodiment, the above components are illustrated as separate elements to distinguish the respective functions of the components. Thus, in actual products, the controller 1510 may be constituted to carry out all the functions or part of the functions.

Figure 16:
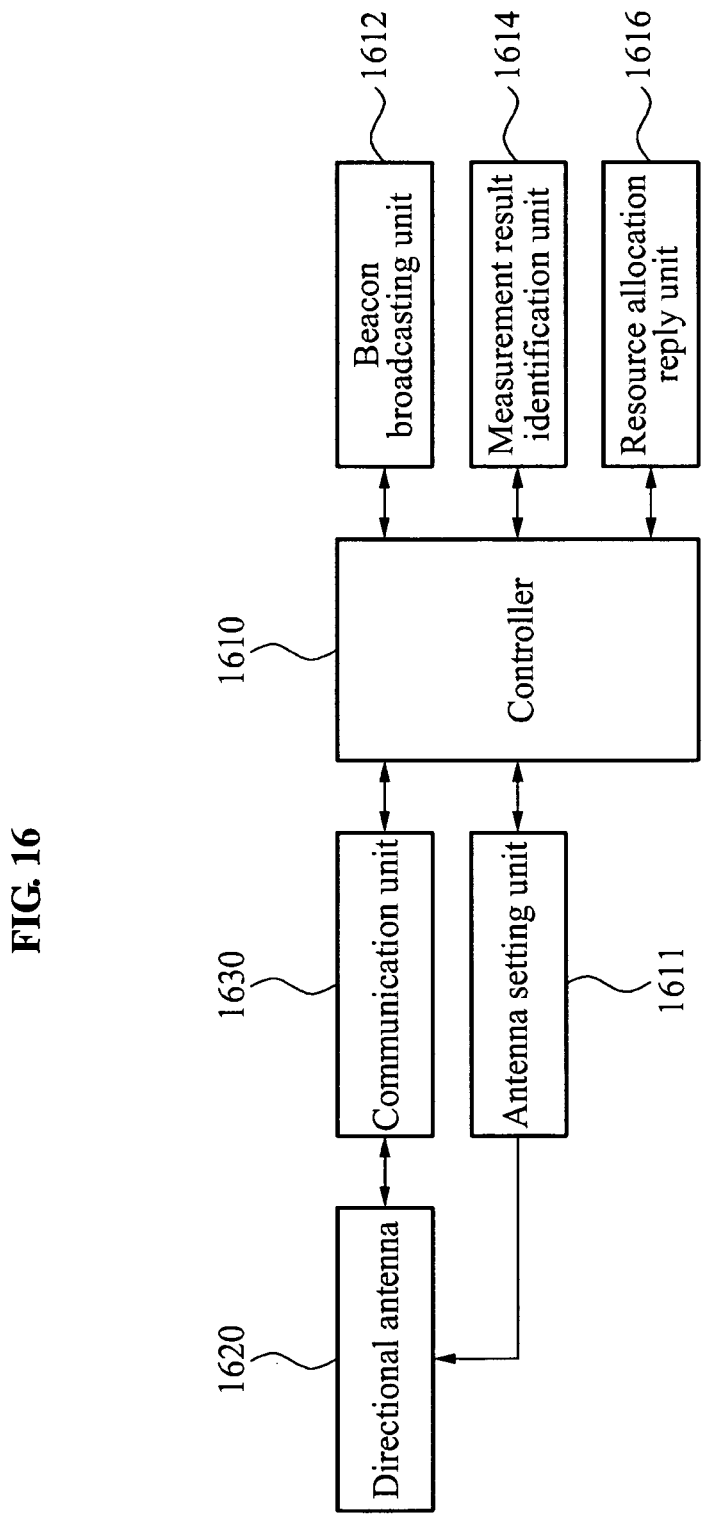
FIG. 16 illustrates a configuration of a central control unit to support spatial reuse in a wireless communication system using a centralized MAC protocol according to an embodiment of the present invention.

FIG. 16 illustrates a configuration of a central control unit to support spatial reuse in a wireless communication system using a centralized MAC protocol according to an embodiment of the present invention.

Referring to FIG. 16, the central control unit includes a controller 1610, an antenna setting unit 1611, a beacon broadcasting unit 1612, a measurement result identification unit 1614, a resource allocation reply unit 1616, a directional antenna 1620, and a communication unit 1630.

The directional antenna 1620 is an antenna to enable a radiation pattern of a beam to face in an optional direction.

The communication unit 1630 transmits and receives data wirelessly with devices in an administered network. The communication unit 1630 decreases a wireless frequency signal received through the directional antenna 1620 to despread and channel-decode the received signal when receiving a signal, and the communication unit 1630 channel-codes and spreads data and increases a frequency to transmit the data through the directional antenna 1620 when transmitting data.

The antenna setting unit 1611 arranges the directional antenna 1620 to guarantee an optimal quality of communication through an antenna training process.

The beacon broadcasting unit 1612 broadcasts a beacon message including resource allocation information at predetermined intervals.

The measurement result identification unit 1614 receives measurement results of a strength and an interference of a received signal corresponding to resources measured by the respective devices from the devices in the network. The measurement results may be received, being included in a scanning result IE.

The resource allocation reply unit 1616 allocates a resource based on an order of priority in allocation of MASs collected through a scanning result IE from each of the a source device and a target device which use the resource when receiving a request for the resource from the source device.

The controller 1610 controls the central control unit overall and may perform functions of the antenna setting unit 1611, the beacon broadcasting unit 1612, the measurement result identification unit 1614, and the resource allocation reply unit 1616. In the present embodiment, the above components are illustrated as separate elements to distinguish the respective functions of the components. Thus, in actual products, the controller 1610 may be constituted to carry out all the functions or part of the functions.

Figure 17:
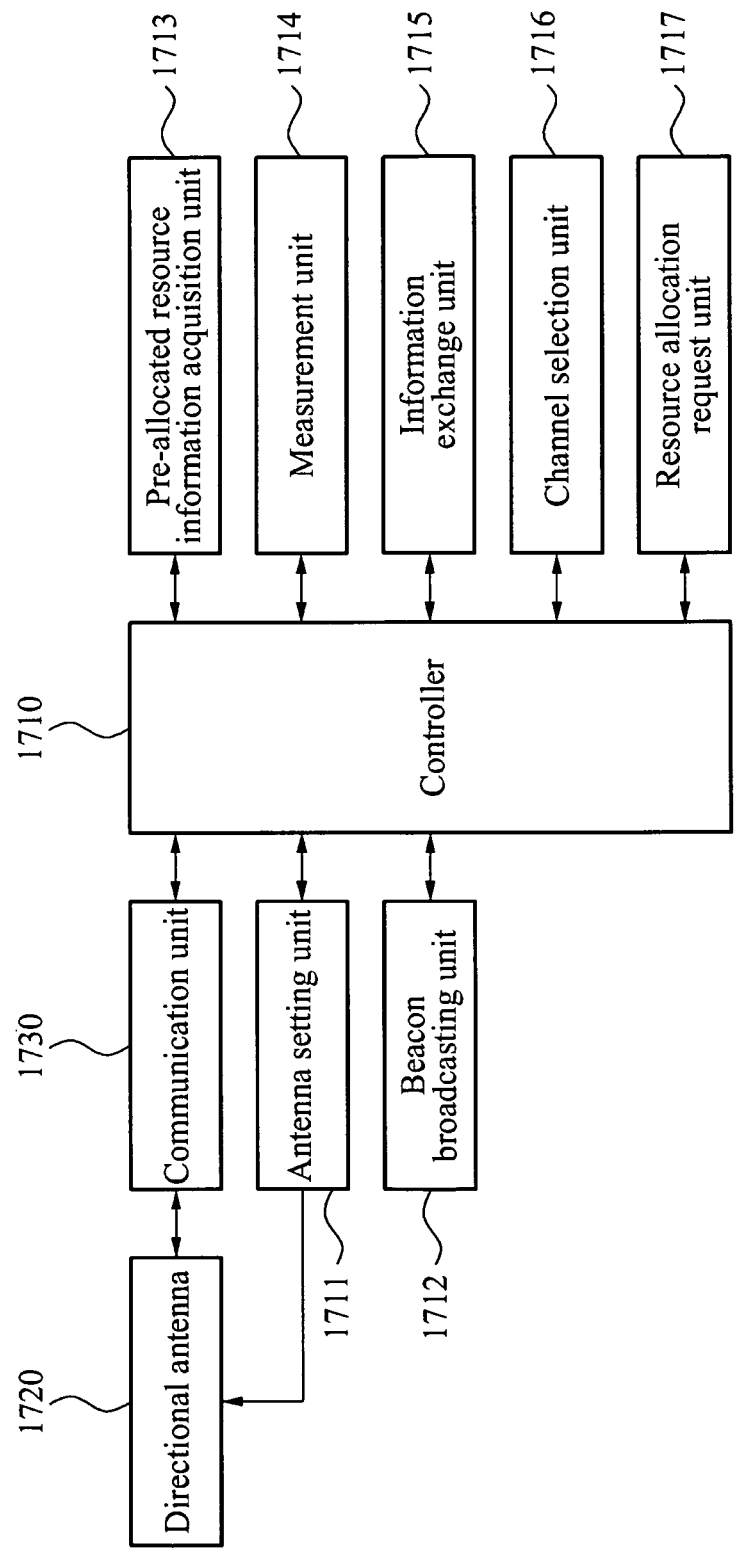
FIG. 17 illustrates a configuration of a source device to support spatial reuse in a wireless communication system using a distributed MAC protocol according to an embodiment of the present invention.

FIG. 17 illustrates a configuration of a source device to support spatial reuse in a wireless communication system using a distributed MAC protocol according to an embodiment of the present invention.

Referring to FIG. 17, the source device includes a controller 1710, an antenna setting unit 1711, a beacon broadcasting unit 1712, a pre-allocated resource information acquisition unit 1713, a measurement unit 1714, an information exchange unit 1715, a channel selection unit 1716, a resource allocation request unit 1717, a directional antenna 1720, and a communication unit 1730.

The directional antenna 1720 is an antenna to enable a radiation pattern of a beam to face in an optional direction.

The communication unit 1730 transmits and receives data wirelessly with an adjacent device and a target device. The communication unit 1730 decreases a wireless frequency signal received through the directional antenna 1720 to despread and channel-decode the received signal when receiving a signal, and the communication unit 1730 channel-codes and spreads data and increases a frequency to transmit the data through the directional antenna 1720 when transmitting data.

The antenna setting unit 1711 arranges the directional antenna 1720 to guarantee an optimal quality of communication through an antenna training process with the target device.

The beacon broadcasting unit 1712 broadcasts a beacon message including information about a resource used by the source device at predetermined intervals.

The pre-allocated resource information acquisition unit 1713 receives beacon messages from adjacent devices and obtains information about a pre-allocated resource of each communication channel using information about a resource used by each of the adjacent devices, the information being included in each of the beacon messages.

The measurement unit 1714 measures a strength and an interference of a received signal corresponding to resources included in respective communication channels.

The information exchange unit 1715 exchanges the obtained information about the pre-allocated resource of the communication channel and a measurement result of each communication channel with the target device. That is, the information exchange unit 1715 transmits the information about the pre-allocated resource of the communication channel obtained by the source device and the measurement result of the communication channel of the source device to the target device, and receives information about a pre-allocated resource of each communication channel obtained by the target device and a measurement result of each communication channel of the target device from the target device.

The channel selection unit 1716 selects a channel having the most optimal and available resources for communication using the information of each communication channel (the information about the pre-allocated resource and the measurement results) of the source device and the target device obtained via the exchange.

The resource allocation request unit 1717 requests a resource for communication in the selected channel from the target device and receives a resource allocation. The resource allocation request unit 1717 may operate in the same as in FIG. 10.

The controller 1710 controls the source device overall and may perform functions of the antenna setting unit 1711, the beacon broadcasting unit 1712, the pre-allocated resource information acquisition unit 1713, the measurement unit 1714, the information exchange unit 1715, the channel selection unit 1716, and the resource allocation request unit 1717. In the present embodiment, the above components are illustrated as separate elements to distinguish the respective functions of the components. Thus, in actual products, the controller 1710 may be constituted to carry out all the functions or part of the functions.

Figure 18:
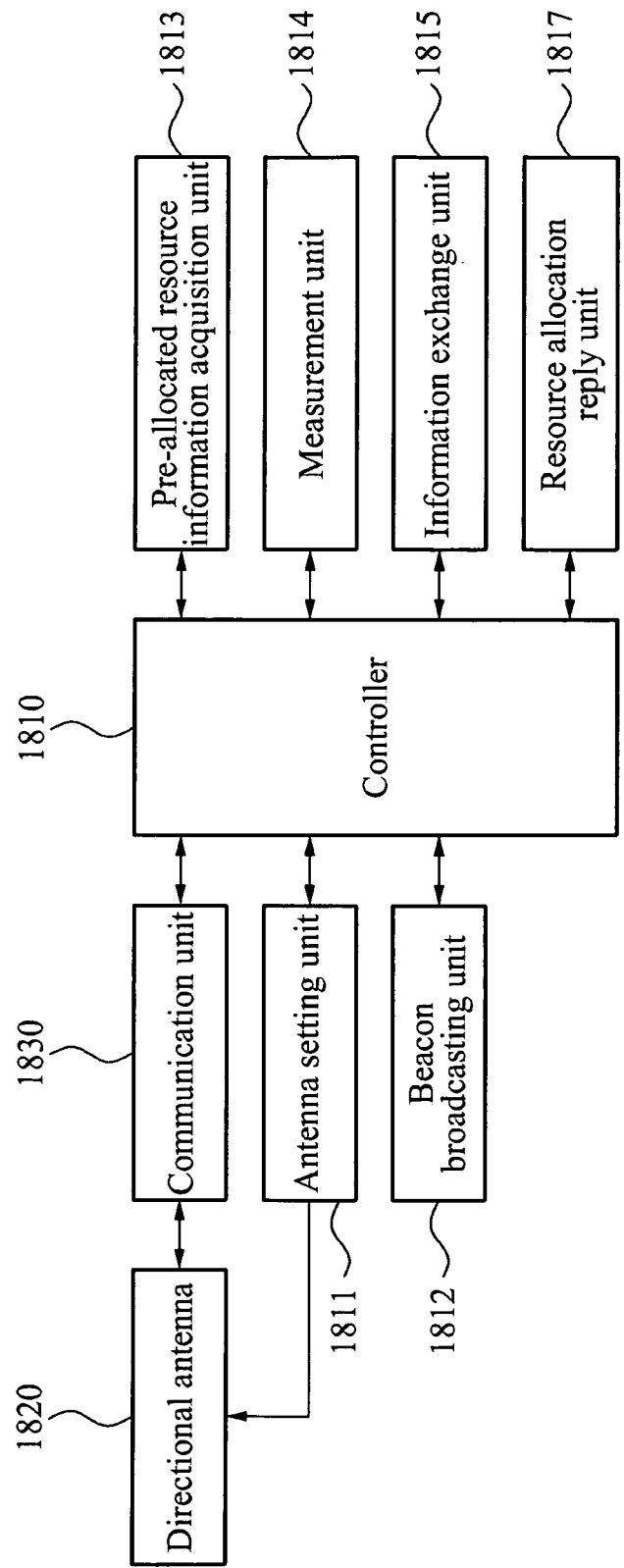
FIG. 18 illustrates a configuration of a target device to support spatial reuse in a wireless communication system using a distributed MAC protocol according to an embodiment of the present invention.

FIG. 18 illustrates a configuration of a target device to support spatial reuse in a wireless communication system using a distributed MAC protocol according to an embodiment of the present invention.

Referring to FIG. 18, the target device includes a controller 1810, an antenna setting unit 1811, a beacon broadcasting unit 1812, a pre-allocated resource information acquisition unit 1813, a measurement unit 1814, an information exchange unit 1815, a resource allocation reply unit 1817, a directional antenna 1820, and a communication unit 1830.

The directional antenna 1820 is an antenna to enable a radiation pattern of a beam to face in an optional direction.

The communication unit 1830 transmits and receives data wirelessly with an adjacent device and a source device. The communication unit 1830 decreases a wireless frequency signal received through the directional antenna 1820 to despread and channel-decode the received signal when receiving a signal, and the communication unit 1630 channel-codes and spreads data and increases a frequency to transmit the data through the directional antenna 1820 when transmitting data.

The antenna setting unit 1811 arranges the directional antenna 1820 to guarantee an optimal quality of communication through an antenna training process with the source device.

The beacon broadcasting unit 1812 broadcasts a beacon message including information about a resource used by the target device at predetermined intervals.

The pre-allocated resource information acquisition unit 1813 receives beacon messages from adjacent devices and obtains information about a pre-allocated resource of each communication channel using information about a resource used by each of the adjacent devices, the information being included in each of the beacon messages.

The measurement unit 1814 measures a strength and an interference of a received signal corresponding to resources included in respective communication channels.

The information exchange unit 1815 exchanges the obtained information about the pre-allocated resource of the communication channel and a measurement result of each communication channel with the source device. That is, the information exchange unit 1815 transmits the information about the pre-allocated resource of the communication channel obtained by the target device and the measurement result of the communication channel of the target device to the source device, and receives information about a pre-allocated resource of each communication channel obtained by the source device and a measurement result of each communication channel of the source device from the source device.

The resource allocation reply unit 1817 identifies whether there is interference in a resource when receiving a request for the resource from the source device. Then, the resource allocation reply unit 1817 transmits a reply to the request for the resource to approve resource allocation to the source device when there is no interference. The resource allocation reply unit 1817 transmits a reply to the request for the resource to reject the request to the source device when there is interference. When the request for the resource is rejected, the resource allocation reply unit 1817 transmits a reply to the request along with a scanning result IE 1430 including information about an MAS in which interference occurs and information to represent an interference.

The controller 1810 controls the target device overall and may perform functions of the antenna setting unit 1811, the beacon broadcasting unit 1812, the pre-allocated resource information acquisition unit 1813, the measurement unit 1814, the information exchange unit 1815, and the resource allocation reply unit 1817. In the present embodiment, the above components are illustrated as separate elements to distinguish the respective functions of the components. Thus, in actual products, the controller 1810 may be constituted to carry out all the functions or part of the functions.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of a source device of a wireless communication system, the method comprising:
   determining information corresponding to a pre-allocated resource including an available medium access slot (MAS) using a beacon message received from an adjacent device;
   transmitting, to a target device, a resource request message including the available MAS for a resource request;
   receiving, from the target device, a resource request reply message, the resource request reply message including,
      when the resource request is approved, a field indicating allocation information with respect to the resource request, and
      when the available MAS has an interference, a field indicating interference information at the available MAS; and
   communicating, with the target device, using the available MAS when the field indicating the allocation information is included in the resource request reply message.

2. The method of claim 1, wherein the determining comprises
   selecting the available MAS among a plurality of MASs for communicating between the source device and the target device, each of the plurality of MASs having a predetermined length.

3. A method of a source device of a wireless communication system, the method comprising:
   determining information corresponding to a pre-allocated resource including an available medium access slot (MAS) using a beacon message received from an adjacent device;
   transmitting, to a target device, a resource request message including the available MAS;
   receiving, from the target device, a resource request reply message including any one of a field indicating allocation information with respect to a resource request and a field indicating interference information at the available MAS;
   communicating, with the target device, using the available MAS when the field indicating the allocation information is included in the resource request reply message; and
   requesting a resource from the target device by reselecting a resource to be requested using resource information of the target device included in the resource request reply message when the field indicating the interference information is included in the resource request reply message.

4. The method of claim 2, further comprising
   receiving, from the target device, a scanning result IE including channel states at the plurality of MASs; and
   selecting a channel for communicating with the target device based on the scanning result IE.

5. The method of claim 4, the scanning result IE comprises
   an element identification (ID) to represent the scanning result IE;
   a length field to represent a length of the scanning result IE;
   a beam index to represent a directional beam used for measuring the channel states; and
   measurement result information including the channel states measured by an MAS zone.

6. The method of claim 1, the information corresponding to the pre-allocated resource includes a distributed reservation protocol (DRP) availability information element (IE).

7. A method of a target device of a wireless communication system, the method comprising:
   receiving, from a source device, a resource request message including a medium access slot (MAS) requested for a resource;
   identifying whether interference exists in the MAS;
   generating a resource request reply message including a resource request result field based on whether the interference exists, including
      setting a value of the resource request result field as a value corresponding to interference when the interference exists, and
      including a resource information of the target device into the resource request reply message; and
   transmitting, to the source device, the resource request reply message.

* * * * *